United States Patent [19]

Charbonnier

[11] Patent Number: 5,241,686
[45] Date of Patent: Aug. 31, 1993

[54] REGULATION OF TRAFFIC LOAD OF FIXED STATIONS IN A CELLULAR RADIO COMMUNICATION NETWORK

[75] Inventor: Alain Charbonnier, Versailles, France

[73] Assignee: France Telecom, Paris, France

[21] Appl. No.: 728,415

[22] Filed: Jul. 11, 1991

[30] Foreign Application Priority Data

Jul. 12, 1990 [FR] France .................................. 90 08886

[51] Int. Cl.⁵ .......................... H04B 7/00; H04B 17/00
[52] U.S. Cl. ..................................... 455/33.2; 455/53.1; 455/54.1; 455/56.1; 455/62; 379/60
[58] Field of Search ...................... 455/33.1, 33.2, 33.4, 455/53.1, 54.1, 54.2, 56.1, 63, 67.1; 379/58, 59, 60, 63

[56] References Cited

U.S. PATENT DOCUMENTS 4,670,899  6/1987  Brody et al. .......................... 455/56.1
5,058,200  6/1990  Huang et al. ......................... 455/33.1

OTHER PUBLICATIONS

Jean-Gabriel Remy et al, "Systems of Radio Communications With the Mobiles" Technique et Scientifique des Telecommunications Collection, Eyrolles, 1988, Chapter 15.5 Radiocom 2000.

*Primary Examiner*—Reinhard J. Eisenzopf
*Assistant Examiner*—Lisa Charouel
*Attorney, Agent, or Firm*—Lowe, Price, LeBlanc & Becker

[57] ABSTRACT

The process aims to constantly optimize the distribution of the radio-electric load on a radio communication cellular network between fixed relays. This is equivalent to increasing or reducing the surface of network cell when the traffic in the cell decreases or increases. Each relay transmits a field correction parameter as a function of a load indicator and fixed factors so that each mobile station corrects the radio electric field and selects the relay corresponding to the highest corrected field. The correction parameter of a relay in a given cell also depends on overload indicators relating to adjacent cells and indicators of field boundary displacements with respect to cells adjacent to the given cell.

22 Claims, 13 Drawing Sheets

GLOBAL LOAD REGULATION AUTOMATON

REGULATION OF TRAFFIC LOAD OF FIXED STATIONS IN A CELLULAR RADIO COMMUNICATION NETWORK

BACKGROUND OF THE INVENTION

1. Field of the Invention

This invention relates to the traffic load regulation on fixed stations, also referred to as relays, in a cellular radio communications network. Consequently this regulation conditions the selection of a fixed station by a mobile station.

2. State of the Prior Art

A radio communication system typically comprises the following members:

Mobile stations which include in particular a radio transmitter/receiver (transceiver), select one of the radio relays as soon as powered up, exchange digital data with the relay, select a radio channel of this relay, set up and receive outgoing and incoming telephone communications via the relay; and A fixed communication network consisting of:
   fixed radio stations (base stations), which each manage a set of radio channels, including one or several signalling radio channels, to exchange digital data with the mobile stations, and interface protocols to set up communications between the telephone network and the mobile stations; and
   an infrastructure comprising computers, switches, and means for carrying digital data and telephone signals thereby implementing functions of switching, location of mobile stations in the network, operating, and optimization of the traffic load in the network.

The most recent heavy traffic networks consist of a large number of fixed stations, each fixed station covering a small geographical area. The radio-electric coverage of a fixed station is then referred to as "cell" and the network is qualified as "cellular".

As the radio-electric resources are limited, it is particularly of interest to manage the network so as to distribute the traffic load between the radio channels and hence between the fixed stations.

In the most recent cellular radiotelephone systems, such as the RADIOCOM 2000 system and Pan-European GSM system, certain means are scheduled to act on the radio load. They can be classified into the following categories:

When a relay has its traffic saturated, it broadcasts saturation data generally in binary, that forbids or strongly dissuades the mobile stations from selecting this relay. Sending of the data is automatically triggered by the fixed station or by the infrastructure in the events of a serious disturbance in the operation. This type of means cannot be used to obtain effective optimization of the radio load.

The cellular networks offer the function of cell transfer in the mobile station whereby a communication in progress continues without interruption when the mobile station moves from one cell to another. In certain systems it is scheduled that in the event of a large scale load on a fixed station the mobile station can be transferred to another cell at the time of setting up the communication or during the communication. In fact it is observed that the greater part of the load on the radio-electric channels is due to telephone communications.

This second solution offers the following drawbacks:

Complexity: the process of cell transfer decision in the mobile station takes account of a large number of parameters including radio-electric measurements made in the adjacent relays and the degree of saturation of these relays. This is a real time process which should be brief, a few seconds. This mechanism is therefore difficult to obtain and to optimize.

Reduction in the quality of the communication: any transfer of mobile station very frequently results in an audible reduction, or a delay in the setting up of the communication.

OBJECTS OF THE INVENTION

The main object of this invention is to distribute the radio-electric load of a cellular network between its various fixed stations and thus regulate the variable numbers of mobile stations allotted respectively to the fixed stations.

Another object of the invention is to regulate the traffic of each fixed station through a variation in the "surface" of the cell containing the fixed station, independently of any variation in the transmission power of the fixed station.

SUMMARY OF THE INVENTION

For this purpose a method for regulating the load of fixed stations in a cellular radio communication network where mobile stations measure the radio-electric fields transmitted by the fixed stations, comprises, relatively to a fixed station associated with one of the cells in the network, the steps of:
   computing a field correction parameter as a function of at least on a load indication of the fixed station depending on the traffic passing over the fixed station and periodically re-evaluated, and on fixed factors,
   transmitting the field correction parameter to the mobile stations, and
   correcting the measured radio-electric field corresponding to the fixed station by the correction parameter into a corrected field in each of the mobile stations, so that the mobile station compares the corrected fields corresponding to the fixed stations and selects one of the fixed stations corresponding to the highest corrected field to establish a radio communication with the selected fixed station.

Thus, according to the invention, for example the higher the number of mobile station having selected a fixed station, the greater the correction parameter, which reduces the corrected measured field by the mobile station and hence the number of mobile stations selecting the fixed station and traffic allotted to it.

According to another feature of the invention, the field correction parameter of a fixed station depends on a proximity load indicator, periodically re-evaluated, which is a combination of an overload indicator relating to fixed stations included in network cells adjacent to the cell containing said fixed station, and a boundary displacement indicator relating to field boundaries between the adjacent cells and the cell of said fixed station, a boundary between two cells being determined by an equality of corrected fields corresponding to said two cells and being displaced as a function of the variations in the correction parameters of said two cells.

If a fixed station operates with low traffic at a given instant, it is capable of automatically absorbing a part of the high traffic of an adjacent fixed station, by "broadening" the coverage of the surface of the cell of said fixed station. This broadening in the coverage results in a decrease of the field correction parameter of this fixed station.

According to the invention, when a fixed station is selecting a mobile station, the fixed communication system operates so as to distribute the mobile stations between the fixed stations according to the load of the fixed stations. Thus, through a statistical effect, this mechanism regulates the radio load due to the communications. The regulating process is more simple and operates with long-time constants as compared to the cell transfer process according to the prior art. It is efficient because correctly adapted to a cellular network geography.

The parameter and indicator computations can be made partially locally in the fixed stations, and partially in centralized facilities, such as a management and maintenance center linked to the fixed stations by specialized telephone line. Nevertheless, according to another embodiment, most of the computations can be made in centralized facilities.

BRIEF DESCRIPTION OF THE DRAWINGS

Further features of this invention will appear more clearly on reading the following description of several preferred embodiments of the invention as illustrated in the corresponding appended drawings in which.

DESCRIPTION OF THE PREFERRED EMBODIMENTS

Figure 1:
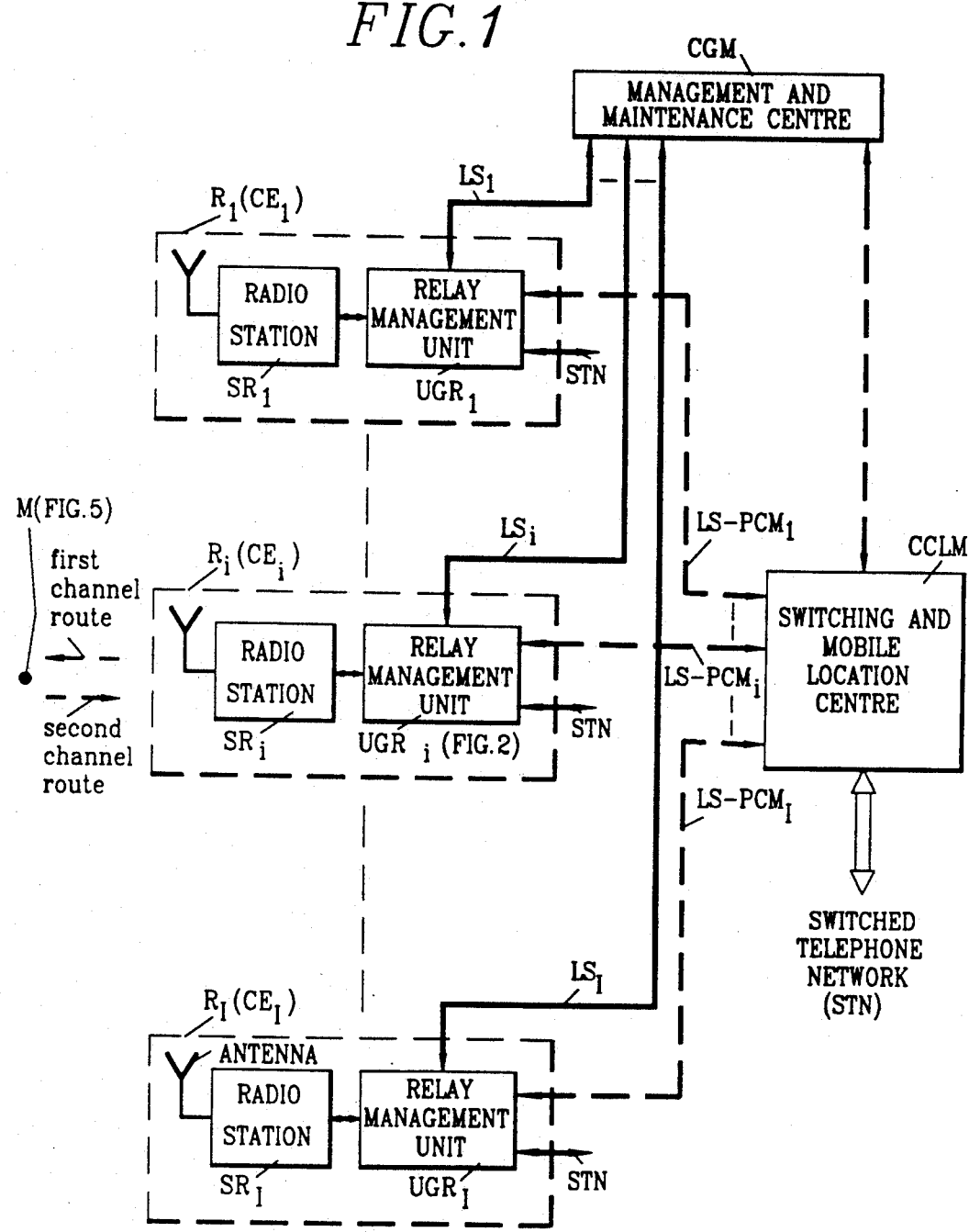
FIG. 1 is a schematic block diagram of a cellular radio communication network for carrying out the method embodied by the invention.

In order to clarify matters, reference hereafter will be made to the example of a cellular radio communication network whose main features are described below.

The radio-electric coverage of the network consists of 256 bidirectional radio-electric channels, duplex or possible half-duplex. Each channel consists of a first route having a 12.5 kHz frequency band width for conveying signals from a fixed station, referred to as "relay" or base station, to a mobile station, referred to as "mobile", and a second route having a 12.5 kHz frequency band width for conveying signals from a mobile to a relay. The bands on the first routes are included in a 12.5*256=3,200 kHz width carrier frequency band, in the same way as the bands of the second routes in another 3,200 kHz band. The two carrier frequency bands are centered between 400 MHz and 900 MHz.

The network comprises I=40 cells $CE_1$ to $CE_{40}$ with each area of about 10 to 40 km². The cells are often collected in groups of adjacent cells referred to as "localization areas". Each cell contains a relay, preferably substantially in the center of the cell, which is associated to 10 to 50 respective channels. At the hours of high telephone consumption, the network services 40*10=400 to 40*50=2,000 mobiles.

A radio channel can transmit the signalling with an FFsK frequency-shift keying modulation relative to a subcarrier of 1,600 Hz±300 Hz for the first and second channels and a rate of 1,200 bit/s. For example, a message is composed of frames having a duration of 173 ms and offering a useful length respectively of 64 bits in the mobile-to-relay direction, and 80 bits in the relay-to-mobile direction, after extracting synchronization and error decoding fields. In the relay to mobile direction, 16 bits of each frame are used to broadcast data to the mobile, referred to as "watch data" which are characteristic of the relay, such as operating status of the relay, charging area, etc.

A radio channel can also conventionally transmit a voice or data signal during a set-up telephone communication.

For each relay covering a cell, a radio channel, referred to as "beacon channel", is specialized as signalling channel. In the relay-to-mobile direction, the first route of the beacon channel transmits messages continuously, and enables a mobile in watch status to access the fixed communication system, relay and switched telephone network, and transmit messages to it. To select a relay, a mobile makes a radio-electric field measurement in the first route of the beacon channel and takes account of the watch data contained in the messages which are continuously sent in the first beacon route.

Localization of a mobile in the cellular network is performed by means of a procedure known under the name of "inscription mechanism". When the mobile changes cell or localization area, when the mobile is powered-up, the mobile signals itself to the fixed system by sending a message on the second route of the beacon channel, corresponding most often to the relay from which the mobile receives the highest radio-electric field. The fixed system comprises a data base whereby the location of the mobiles can be stored.

The architecture of the cellular network is illustrated in FIG. 1. Each $CE_i$ cell, where i is an integer lying between 1 and I, is covered by means of a relay. $R_i$ which chiefly comprises a radio transmitting-receiving station $SR_i$ and a relay management unit $UGR_i$.

The relay management unit $UGR_i$ is linked by PCM-type interfaces to the switched telephone network STN. Nevertheless, as shown in short dotted lines in. FIG. 1, for cellular networks with high traffic density, the unit $UGR_i$ is also linked via a specialized link $LS\text{-}PCM_i$ to a switching and mobile location center CCLM which centralizes the functions of mobile localization, and of inter-cellular transfer whilst in process of communication. The CCLM center is linked to the switched telephone network STN.

The cellular network also includes network operating means. The relays are operated, preferably locally as from as teletype TTY. The relays $R_1$ to $R_I$ are also remote operated from a management and maintenance center CGM, to which the relays are connected by specialized four-wire links $LS_1$ to $LS_I$.

The radio station $SR_i$ contains an antenna and conventional power transmission and receiving, modulating and demodulating means for each of the radio channels allotted to the relay. The transmission power $P_i$ of the station $SR_i$ is constant for all the radio channels and is invariable even when the traffic in cell $CE_i$ is saturated.

In this connection notably one can refer to the book entitled "Systémes de radiocommunication avec les mobiles (Systems of Radio Communication With the Mobiles)" by Jean-Gabriel REMY, Jean CUEUGNIET and Cédric SIBEN, Technique et Scientifique des Télécommunications Collection, Eyrolles, 1988, and especially to Chapter 15.5 "RADIOCOM 2000" in this book.

RELAY MANAGEMENT UNIT

Figure 2:
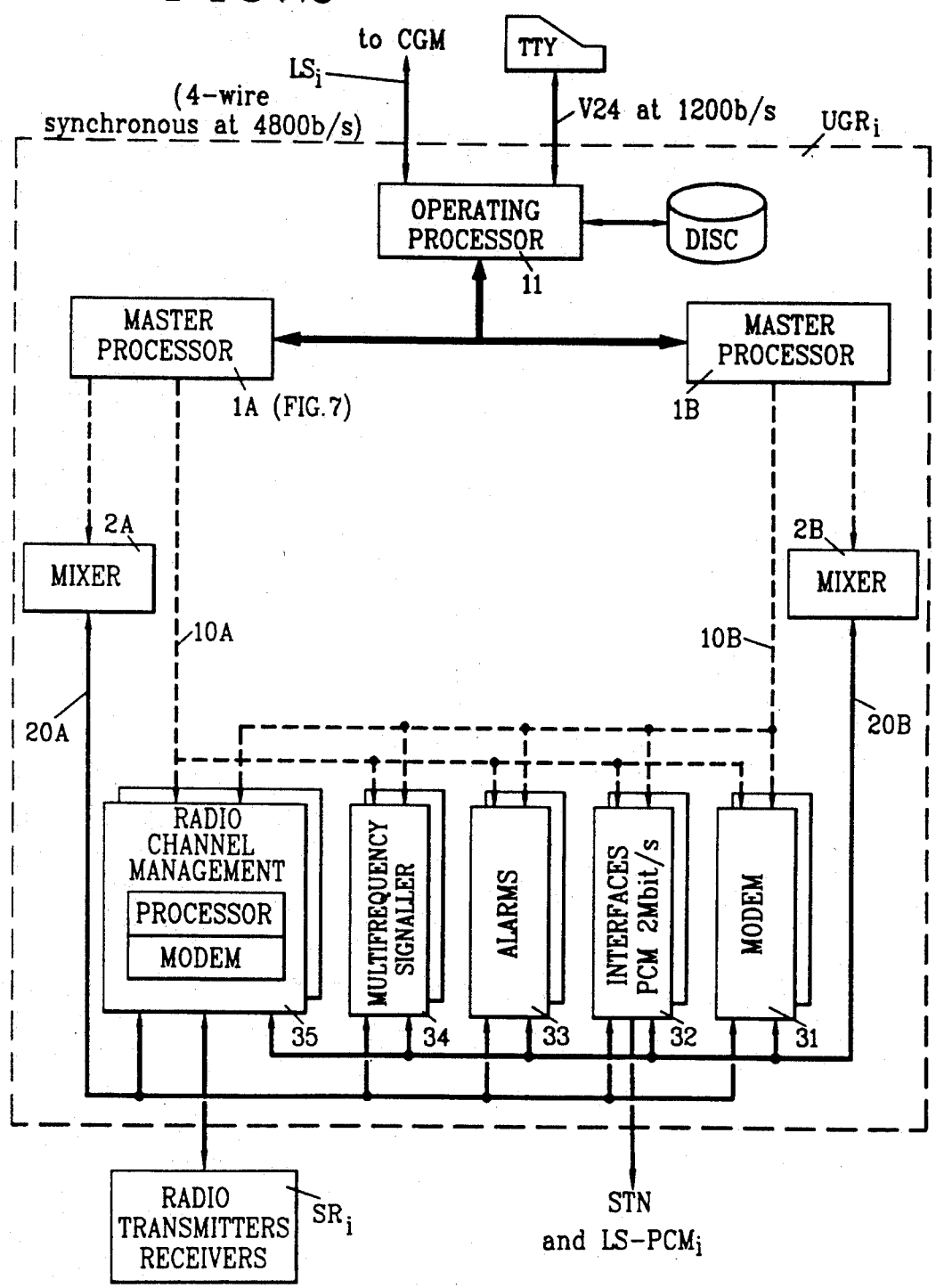
FIG. 2 is a detailed block diagram of a relay management unit included in the network shown in FIG. 1.

Referring to FIG. 2, a relay management unit $UGR_i$ includes two identical assemblies each consisting of a master processor 1A, 1B, such as an INTEL 80286 processor with 2-Moctets memory, a route mixer 2A, 2B and a control bus 10A, 10B. These assemblies operate in normal mode and in back-up mode respectively. Slave circuits, in variable numbers according to the capacity of the relay, manage signal exchanges with the switched telephone network STN, and the switching and location center CCLM, and also the transmitters and receivers in radio station $SR_i$. The slave circuits, here numbering five, 31 to 35 are put into relation with mixers 2A and 2B via two 8-channel buses PCM 20A to 20B with a rate of 8*256=2,048 kbit/s. Each slave circuit is allotted in control bus 10A, 10B to a signalling link with the active master processor 1A, 1B, of type 9,600 bit/s asynchronous serial link. Each slave circuit includes a processing unit such as INTEL 8088 processor with 32-kilooctets memory, and means specific to each type of circuit. The chief slave circuits are:

- a double 300-bit/s modem 31 ensuring exchanges of data with other relays $R_1$ to $R_{i-1}$ and $R_{i+1}$ to $R_I$ via the network STN, or the switching and location center CCLM;
- a double PCM interface at 2 Mbit/s, 32, connecting the management unit $URG_i$ to the switched telephone network STN, directly or via the specialized link $LS\text{-}PCM_i$;
- hardware alarm management device, 33;
- a double multifrequency signaller 34 managing and encoding/decoding the user's number;
- a double radio channel management interface 35 which switches the voice and/or signalling signals to the radio channels and which in particular includes an FFSK 1,200 bit/s modem transmitting or receiving signalling messages in the radio channels associated to station $SR_i$.

The relay management unit $UGR_i$ also includes an operating (working) processor 11 of INTEL 8086 type with M byte memory, performing the unit operating functions Processor 11 manages an interface to a teletype TTY of type serial asynchronous link V24 at 1,200 bits/s for local operation, and a second interface to the management and maintenance center CGM via the specialized four-wire link $LS_i$ used at 4,800 bits/s, in synchronous mode.

Figure 3:
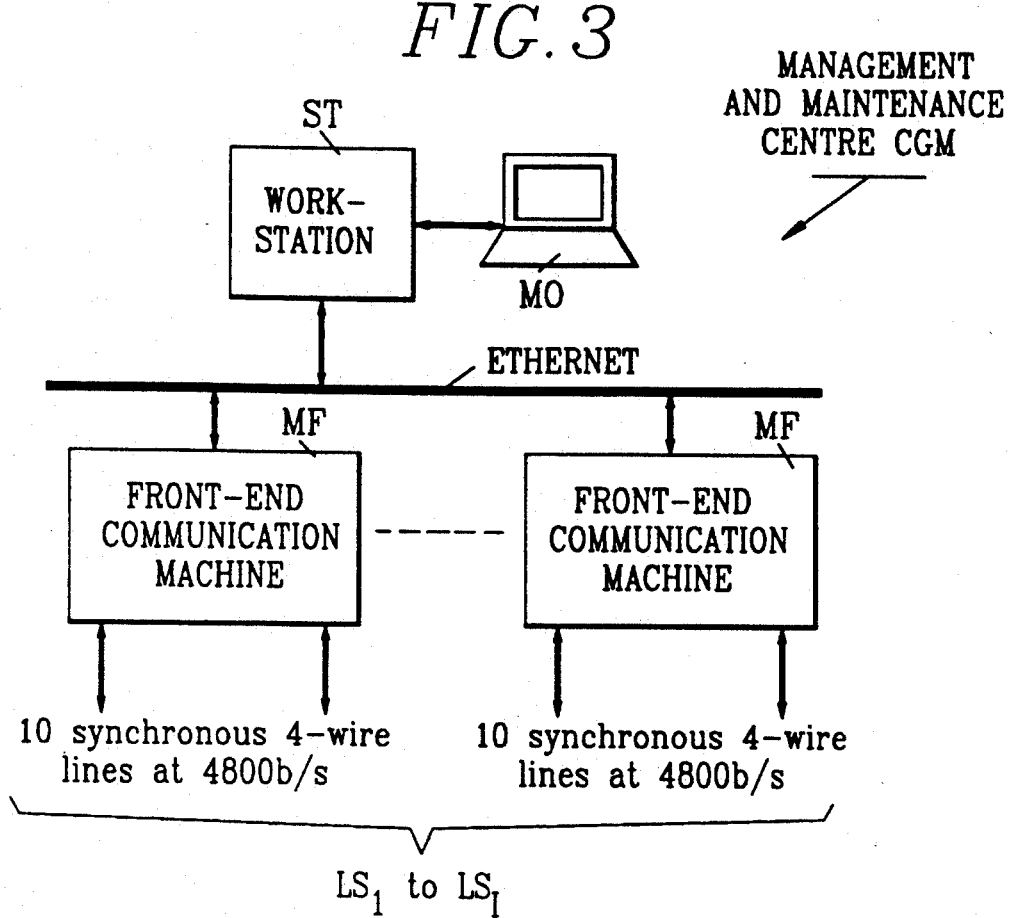
FIG. 3 is a schematic block diagram of a relay management and maintenance center included in the network shown in FIG. 1.

The management and maintenance center CGM is now described referring to FIG. 3. It includes front-end communication machines MF each managing four-wire. and 4,800 bit/s linkage interfaces $LS_1$ to $LS_I$ with a group of relays, for example numbering 10. The machines MF are coupled to an ETHERNET bus. A factor and indicator processing machine ST included in the center CGM is typically a work-station ST using the UNIX operating system and sufficiently powerful. Station ST is conventionally linked to a monitor MO with screen and keyboard notably to select factors specific to the indicator and parameter computations and to display traffic data and statistics.

RELAY SELECTION

The principle of selecting a relay by a mobile together with the different means devised for this selection as embodied by the invention are now described.

Figure 4:
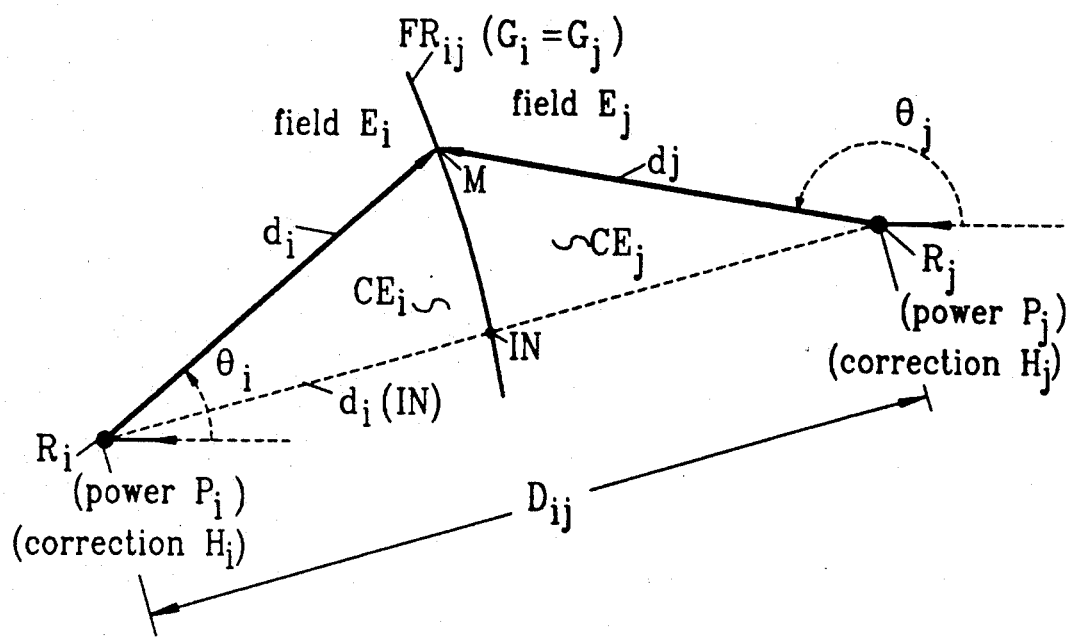
FIG. 4 is a graph explaining the selection of a relay by a mobile station and the definition of the boundary between two adjacent cells in the network.
Figure 5:
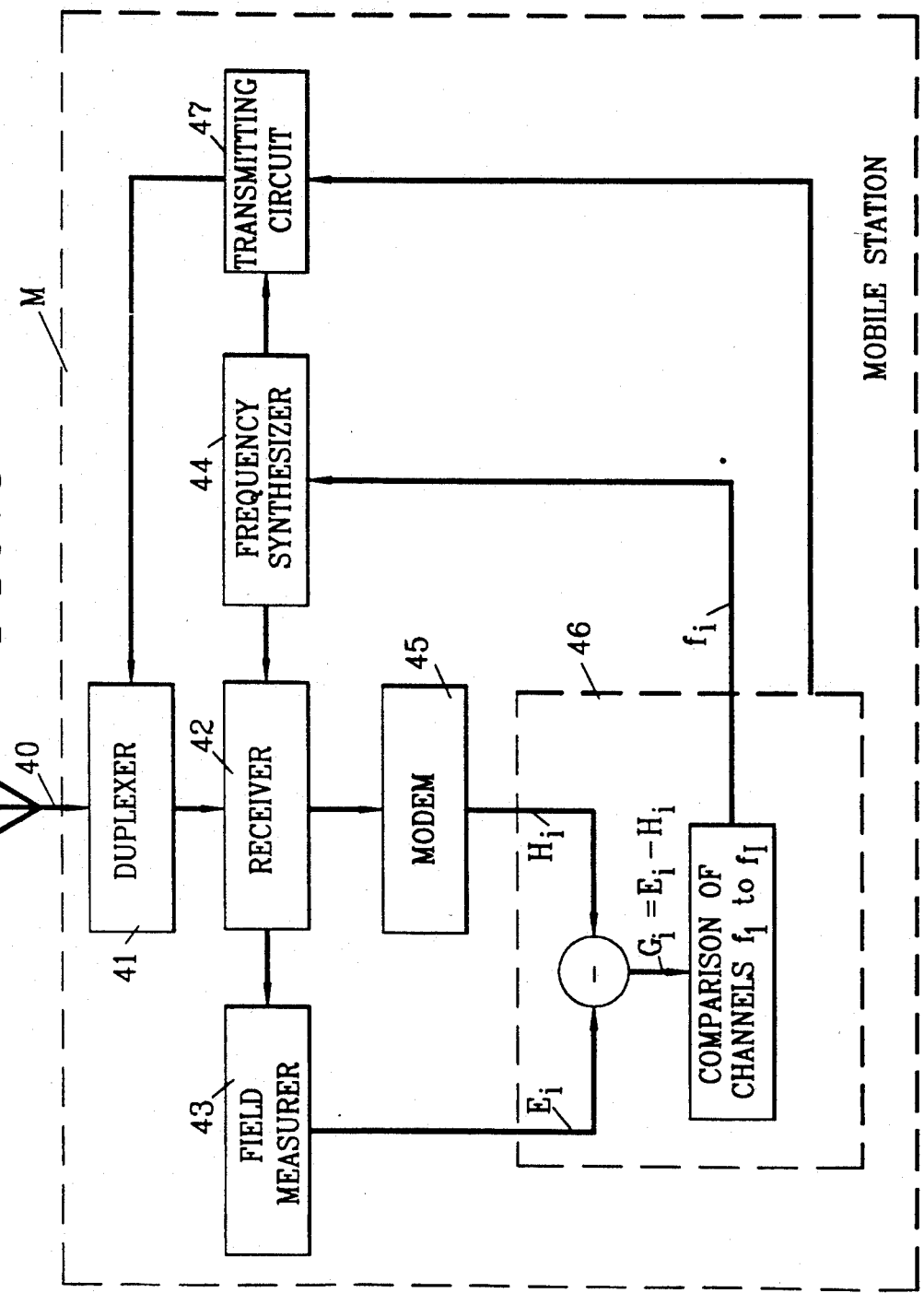
FIG. 5 is a schematic block diagram of a mobile station.

According to the graph in FIG. 4, it is recalled that each relay $R_i$ continuously sends a predetermined signal referred to as "beacon route". The mobiles measure the radio-electric fields, denoted $E_1$ to $E_I$, of the beacon routes that they receive modelization of the propagation process consists in expressing field $E_i$ from relay $R_i$ and received by a given mobile M, as a function of the constant transmission power of relay $R_i$, denoted $P_i$, of the distance between mobile M and relay $R_i$, denoted $d_i$, and the positioning angle between the line joining up mobile M and relay $R_i$ and the propagation axis of the antenna of relay $R_i$, denoted $\Theta_i$:

$$E_i = E(P_i, d_i, \Theta_i). \tag{1}$$

In an urban environment one can choose for example:

$$Ei = -40 \log (d_i/f_i) + P_i \text{ in dBm} \tag{2}$$

where $f_i$ is a function of angle $\Theta_i$.

Moreover, each relay continuously broadcasts, via the respective beacon route, digital information used by mobile M in the relay selection process, in particular one or several radio-electric field correction parameters. These parameters are also used for radio engineering purposes. As embodied by the invention, one of these parameters is a field correction parameter, denoted $H_i$. For each received beacon route, the mobile computes a corrected field, denoted $G_i$, which is a function of $E_i$ and $H_i$:

$$G_i = G(E_i, H_i). \qquad (3)$$

$G_i$ is an ascending function of $E_i$ and is typically expressed according to the relation:

$$G_i = E_i - H_i \text{ in dBm}. \qquad (4)$$

Mobile M then compares the value of the corrected fields $G_1$ to $G_I$, and adopts the relay corresponding to the highest corrected fields, i.e., for example field $G_i$ relating to relay $R_i$.

Thus for a given mobile M, the boundary $FR_{ij}$ between two adjacent cells $CE_i$ and $CE_j$, where the indices i and j are lying between 1 and I, is defined by the equation:

$$G_i = G_j, \qquad (5)$$

i.e., $$G(E(P_i, d_i, \Theta_i), H_i) = G(E(P_j, d_j, \Theta_j), H_j). \qquad (6)$$

With $P_i$, $P_j$, $H_i$ and $H_j$ fixed, this latter equation determines the layout of the boundary $FR_{ij}$ between cells $CE_i$ and $CE_j$.

In the particular case corresponding to equations (2) and (4), the following relation is deduced for the intersection IN between the boundary and the line linking relays $R_i$ and $R_j$:

$$d_i(IN) = d_{io} \frac{D_{ij}/d_{io}}{1 + (D_{ij}/d_{io} - 1) \cdot 10^{(H_i - H_j)/40}} \qquad (7)$$

$D_{ij}$ is the distance between the two relays $R_i$ and $R_j$ and $d_{io}$ is the value of $d_i$ for $H_i - H_j = 0$.

The location of the boundary $FR_{ij}$ therefore depends on the value of the difference between the correction parameters $H_i$ and $H_j$. Thus the surface of a cell $CE_i$ depends on the value of its correction parameter $H_i$, and the value of the correction parameters $H_j$ of cells adjacent to cell $CE_i$.

Assuming the mobiles uniformly distributed in the cellular network, the number of mobiles having selected a relay and hence the radio traffic of the relay, is in proportion to the surface of the cell. Thus as embodied by the invention, a variation in parameter $H_i$ of cell $CE_i$ or parameters $H_j$ of adjacent cells results in a variation in the surface of cell $CE_i$ and hence in the radio traffic of relay $R_i$. It should be noticed that the variation in the parameter $H_i$ has no influence whatsoever on the transmission powers of relay $R_i$ and the mobiles which are entirely independent of the results of the selection of relay and which are constant.

For example assuming cell $CE_i$ circular, centered on relay $R_i$, it is shown by means of equation (7), that an increase in correction parameter $H_i$ of 1 dB implies a reduction in the corrected field $G_i$ and a closing up of the boundaries between cell $CE_i$ and adjacent cells $CE_j$ towards relay $R_i$ and, consequently, creates a reduction in traffic of 6%. The traffic is thus transferred to all the cells adjacent to cell $CE_i$. Reciprocally, for a predetermined number of channels of relay $R_i$, any increase in traffic involving saturation is avoided, as embodied by the invention, by reducing the surface of cell $CE_i$ and hence increasing the correction parameter $H_i$.

The process as embodied by the invention therefore chiefly consists in regulating the radio-electric load of each of the relays by modifying the relay's field correction parameter by means, termed automaton, designed to optimize the load distribution between the different relays.

Relays $R_1$ to $R_I$ continuously broadcast messages in the respective first beacon routes. Each message contains, as already stated, a 16 bit field containing watch data characterizing the relay. Four bits for example are used to encode the correction parameter. Thus the correction parameter can take on 16 values from 0 to 15 dB per pitch of 1 dB.

When mobile M is on watch, i.e., when no communication is set-up, the mobile, cyclically, firstly is listening in to the beacon route in the possible event of receiving a message from the relay in the cell in which the mobile is located, secondly scans the other beacon routes that the mobile receives.

MOBILE STATION

Figure 6:
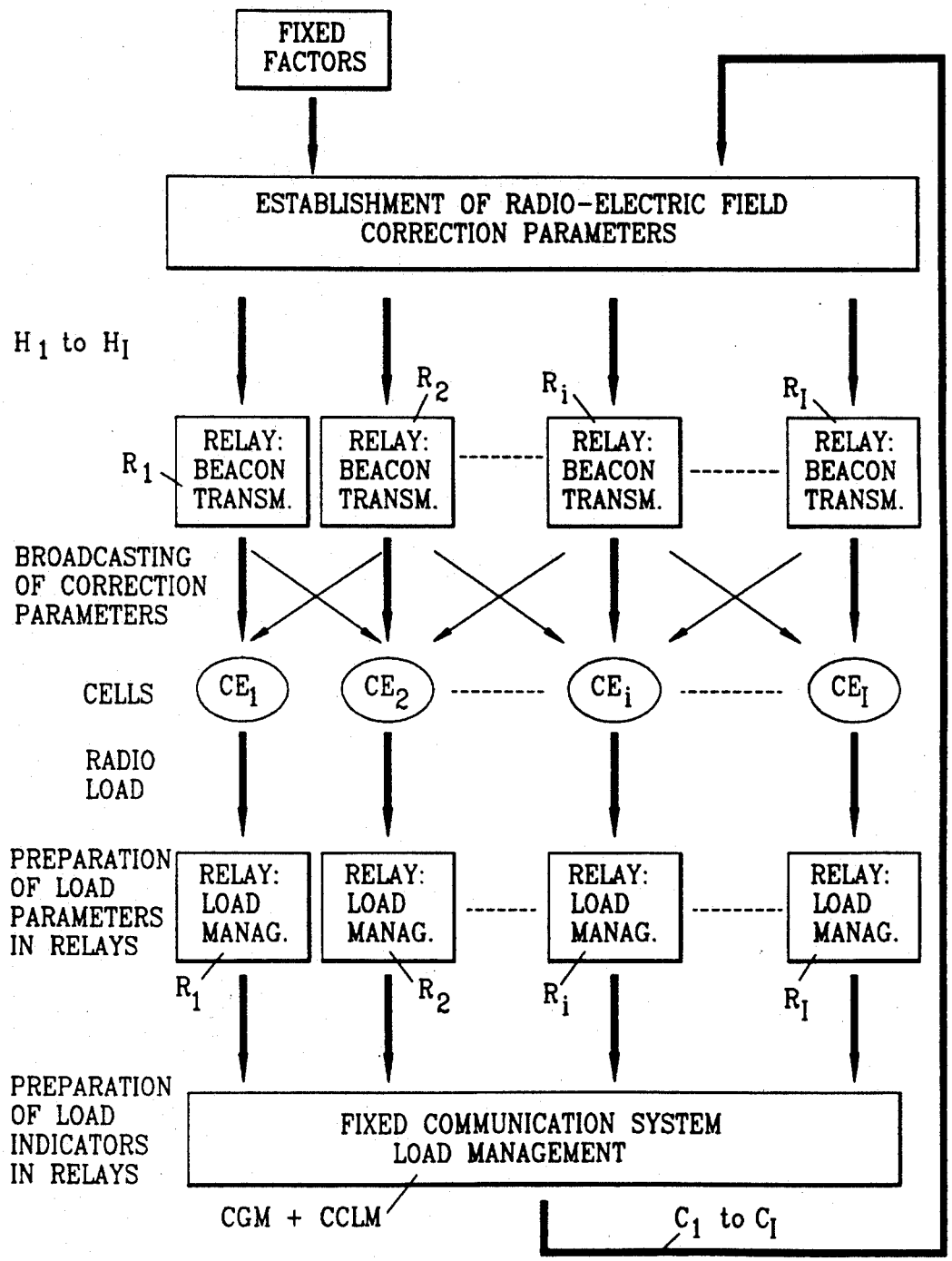
FIG. 6 is a basic block diagram for explaining the regulation of the relay traffic, and more especially the serving of the field correction parameters to the load of the relays.

The hardware means in the mobile of interest for the invention are shown in FIG. 6. Mobile M comprises a receiver 42 receiving radio-electric signals via an antenna 40 and a duplexer 41, a field measurer 45, typically of sensitivity 5 to 50 dB/uV emf, a frequency synthesizer 44 determining the receiving and transmitting frequencies, a FFSK modem 45 demodulating the FFSK signalling at 1,200 bit/s, and a central processing unit 46, such as Zilog Z80-type microprocessor. Mobile M also includes a transmitting circuit 47 connected to synthesizer 44 and duplexer 41 and controlled by unit 46.

Unit 46 possesses a table of frequencies $f_1$ to $f_I$ of the radio channels that can be used as beacon routes and assigned to relays $R_1$ to $R_I$. Synthesizer 44 is positioned successively and cyclically on each of these frequencies. For each frequency $f_i$, the output signal from modem 45 is analyzed by unit 46 to determine firstly whether it is a beacon route in reply to watch data, and if necessary to read the characteristic data of relay $R_i$, amongst which the value of the field correction parameter $H_i$. simultaneously the field measurer 43 measures the power of the received field $E_i$ for the beacon route of relay $R_i$ and transmits the value of the measured field to unit 46. Unit 46 computes the difference $E_i - H_i$ and stores corrected field $G_i$ in memory.

When mobile M has scanned all the beacon routes listed in the table of frequencies, including the beacon route of the channel in which it is located, unit 46 compares the values of the corrected field and determines the beacon route having the highest corrected field value such that a quantity $E_i - H_i$ obtained by deducting the value of the correction parameter from the value of the field according to equation (4) attributed to the preferred embodiment described here. If this beacon route is different from the beacon route of the relay in which the mobile is located, the mobile changes relay and selects the corrected field with the highest value.

The mobile, for example, scans a beacon route every 700 ms. Every 700 ms the mobile remains listening to the first beacon route of the relay in which the mobile is located, for approximately 180 ms (1 frame), and the remainder of the time positions itself on the frequency of another beacon route in order to scan it. For I=40 beacon routes, the scanning period is approximately 28 seconds.

Different traffic load indicators are generally computed by the fixed communication system and are for example as follows:

on each of relays $R_1$ to $R_I$, the radio traffic;

on a cell or on geographical areas comprising several adjacent cells and referred to as localization area, the number of mobiles which are "inscribed" in the cell or in the localization area. The fixed system knows either the number of the cell or the number of the localization area in which each mobile is located, so that calls from the telephone network can be routed.

The local indicators are used to control the field correction parameter(s) of each of the relays. According to FIG. 6 the automaton schematically comprises parameter establishing means which compute the value of the field correction parameter(s) of each of the relays contingent on the value of the load indicators, and contingent on factors fixed by the operators. Each relay $R_i$ transmits the respective correction parameter $H_i$ which operates on the surface and load of the corresponding cell $CE_i$ and on those of the adjacent cells. The load indicators are produced on each relay, and on the infrastructure of the fixed system. These load indicators can themselves be produced as from elementary indicators.

LOCAL LOAD REGULATION AUTOMATON

According to a first invention embodiment mode, a correction parameter $H_k$ is established on the corresponding relay $R_k$ where k is an integer lying between 1 and I. In this case a local load regulating automaton, shown in FIG. 7, chiefly uses the hardware facilities of the relay management unit $UGR_k$ of relay $R_k$ shown in FIG. 2.

For relay $R_k$, the automaton basically consists of a traffic load measuring module 12, supplying a load indicator $C_k$, and a module 13 computing the radio-electric field correction parameter $H_k$. These two modules are obtained by means of master processor 1A or 1B of unit $URG_k$.

The values of the factors of the automaton are fixed by the management and maintenance center CGM. They are managed, as far as concerns their storage in memory on disc and their checking of the value coherence are concerned, by operating processor 11 of unit $UGR_k$. These factors include in particular the minimum value $Hmin_k$ and maximum $Hmax_k$ of correction parameter $H_k$. These two values firstly define the variation range of correction parameter $H_k$ and secondly contribute to manually adjust the "minimum" and "maximum" coverage area of relay. $R_k$. These fixed factors also include a nominal traffic load threshold $b_k$, a hysteresis threshold $e_k$, and a loss factor $a_k$ less than 1. Factors $b_k$ and $c_k$ are expressed in Erlangs, factor $a_k$ in Erlang/dB, and the fields in dBm.

The values of load indicator $C_k$ and correction parameter $H_k$ are sampled periodically by operating processor 11. The samples obtained are transmitted periodically, for example every 30 s, to the management and maintenance center CGM for display, and are used to analyze the traffic status of the different relays in the network.

The correction parameter $H_k$ is inserted in the messages transmitted in the first beacon route by the processor of slave interface 35 managing the radio channels associated to relay $R_k$.

Figure 8:
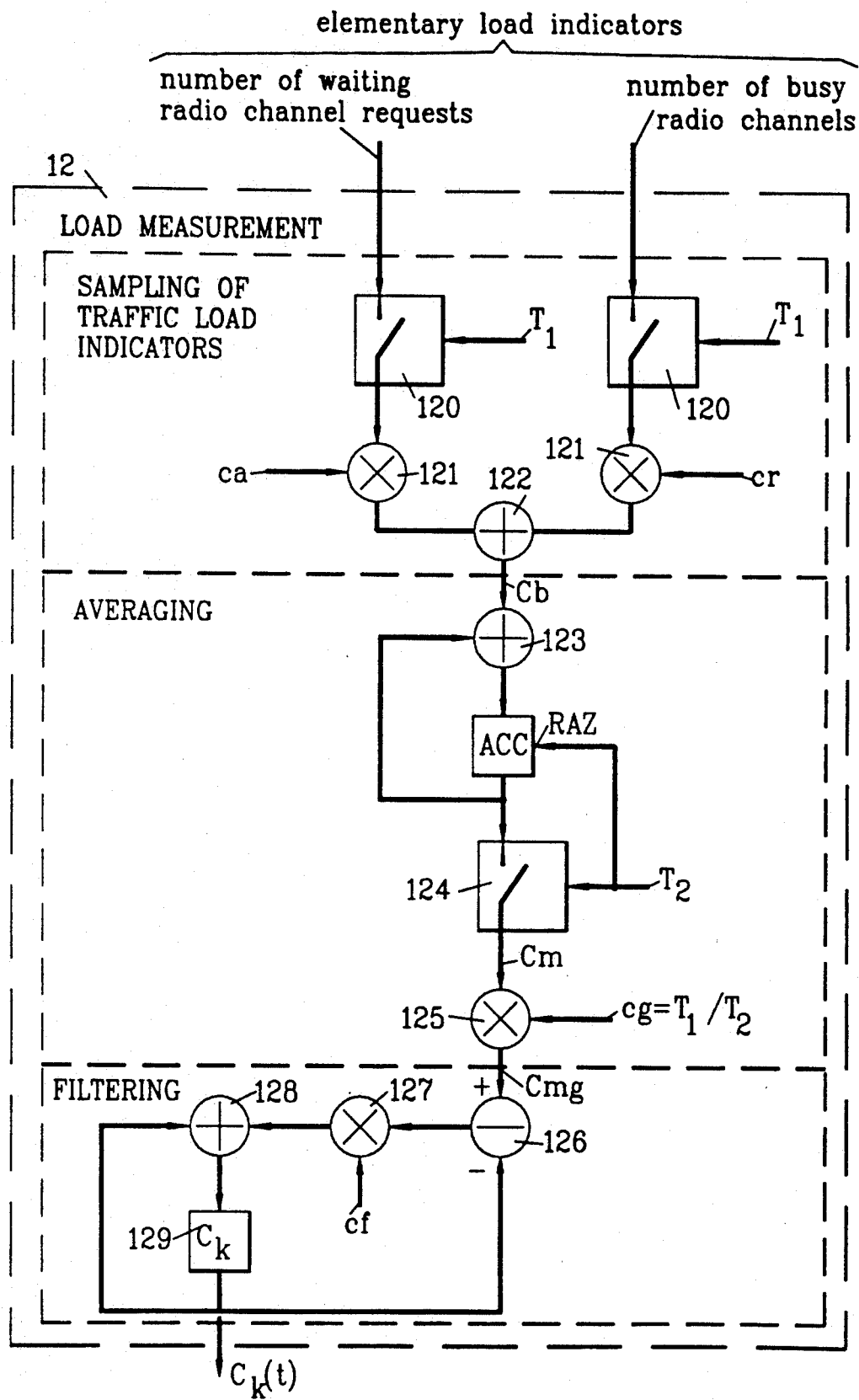
FIG. 8 shows, in the form of a schematic algorithm, a traffic load measuring module included in a relay management unit according to FIG. 7.

A mode of embodiment of the load measuring module 12 is shown in FIG. 8. Elementary traffic load indicators determined by operating processor 11 are for example two: the number of radio channels of relay $R_k$ which are busy, and the number of waiting requests for radio channels. Other elementary load indicators can be used in the same way such as for example the number of mobiles "inscribed" in cell $CE_k$.

The elementary load indicators are sampled in 120. A first intermediate load indicator cb is obtained by the linear combination 122 of the two elementary indicators which are weighted in 121 by coefficients ca and cr, for example ca = cr = 1. The load indicator Cb is processed with the aid of averaging and filtering means. The averaging means include an adder 123 and an accumulator ACC, in which the accumulation of the values of Cb calculated every $T_1 = 5$ second, is stored in memory. Every $T_2 = 60$ seconds, the value Cm of the indicator thus accumulated in accumulator ACC is read in 124 and the accumulator is reset (RAZ):

$$Cm(t) = Cb(t-55\ s) + Cb(t-50\ s) + \ldots + Cb(t-5\ s) + Cb(t),$$

where t designates the time variable.

The value cm is multiplied in 125 by a factor cg, representing the inverse of the number of samples accumulated in the accumulator during $T_2$, i.e., $cg = T_1/T_2$. The produce obtained Cmg is equal to the average of the intermediate load indicator values during $T_2$.

$$Cmg = Cm*cg$$

Filtering is for example of order-1 recursive-type and includes a subtractor 126 between the averaged indicator Cmg and the "filtered" indicator $C_k$ outgoing from module 12, a multiplier 127 multiplying the obtained indicator difference by a coefficient cf thereby deriving a produce indicator, and an adder 128 adding the output indicator and the produce indicator to supply the indicator $C_k$ to a cell of buffer memory 129. The filtering is expressed by:

$$C_k(t) = C_k(t-T_2) + cf*(Cmg(t) - C_k(t-T_2)).$$

The load indicator value $C_k$ is thus computed and stored in memory every $T_2$ seconds. The coefficient cf is for example equal to 0.2.

Figure 9:
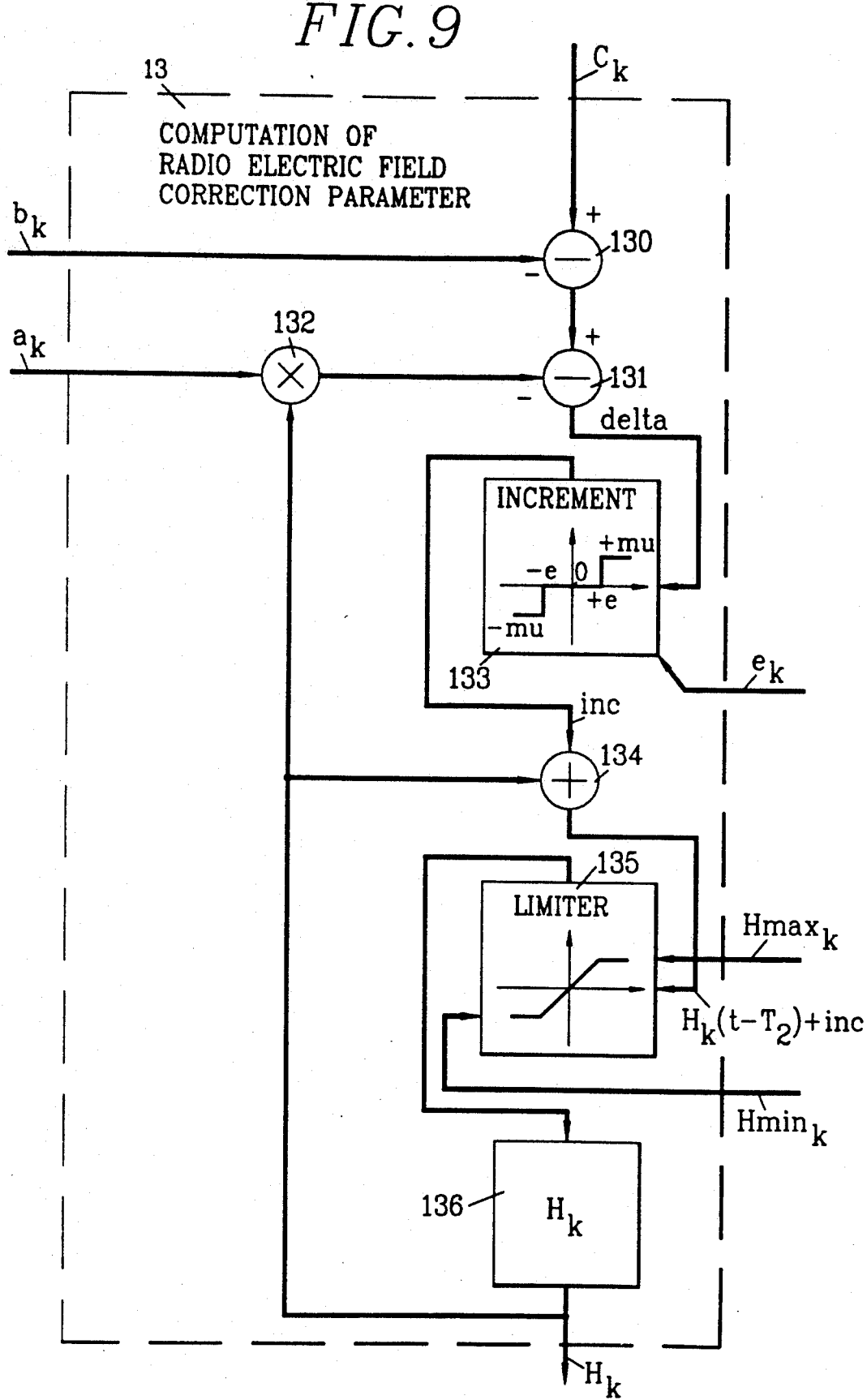
FIG. 9 shows, in the form of a schematic algorithm, a radio-electric field correction parameter computation module included in the relay management unit according to FIG. 7.

The radio-electric field correction parameter computation module 13 is shown in FIG. 9. This computation is preferably made at the computation rate of load indicator $C_k$, i.e., every $T_2 = 60$ seconds.

Module 13 computes a "delta" load differential, function of the nominal load threshold $b_k$ and the loss factor $a_k$, by means of two subtractors 130 and 131 and a multiplier 132 according to the relation:

$$\text{delta} = C_k - b_k - a_k * H_k(t-T_2). \tag{8}$$

Then a comparison means 133 in module 13 determines the value of an increment inc of the correction parameter $H_k$ as a function of the value delta in relation to the hysteresis threshold $e_k$:

if $e_k <$ delta, then $inc = +mu$; (9)

if $-e_k <$ delta $< +e_k$, then $inc = 0$;

if delta $< -e_k$, then $inc = -mu$.

In the case of the cellular network described with reference to FIG. 1, given that the pitch of the correction parameter encoded in the messages is 1 dB, mu is selected as equal to 1 dB.

The sum of the former value of the correction parameter $H_k(t-T_2)$ and the increment inc at instant t is obtained in an adder 134 and is limited by predetermined values $Hmax_k$ and $Hmin_k$ in a comparison circuit 135:

if $Hmax_k < H_k(t - T_2) + inc$, then $H_k(t) = Hmax_k$     (10)

if $Hmin_k < H_k(t - T_2) + inc < Hmax_k$,
then $H_k(t) = H_k(t - T_2) + inc$;

if $H_k(t - T_2) + inc < min_k$, then $H_k(t) = Hmin_k$.

The new value of the correction parameter $H_k(t)$ is stored in buffer memory cell 136.

The principle of regulating the load of relay $R_k$ is as follows. As already stated, the radio-electric load of the relay is a descending function of the value of correction parameter $H_k$. Thus the local automaton embodying the invention tends to cancel the value of the delta variable according to relation (8). In fact, if the load increases, the load indicator $C_k$ increases, and delta becomes positive, then greater than $e_k$. According to inequalities (9) and (10), the correction parameter $H_k$ is incremented by the value mu (1 dB) which lowers the load of the relay and thus regulates the load of the relay.

Thus with $a_k=0$, the local automaton tends to maintain the value of load indicator $C_k$ equal to the nominal load threshold $b_k$. The value of $b_k$ corresponds to a maximum traffic of relay $R_k$, i.e., to a saturation of the traffic allowing for an acceptable quality of service; for example for a relay of 40 channels, $b_k$ equals 30 Erlang.

The hysteresis threshold $e_k$ avoids oscillations due in particular to the finished pitch of the correction parameter; for example $e_k=0.03*b_k$.

Regulation only operates between the limits $Hmin_k$ and $Hmax_k$ of the variation range of the correction parameter. In the case where parameter $H_k$ reaches the lower limit $Hmin_k$, the load indicator $C_k$ can become lower than the nominal load threshold $b_k$. In the case where correction parameter $H_k$ reaches the higher limit $Hmax_k$, the load indicator $c_k$ can become higher than the nominal load threshold $b_k$ which causes a bad quality of service.

The loss factor $a_k$ when it is applied to all the relays $R_1$ to $R_J$ in the network, reduces the variations in the correction parameters $H_1$ to $H_J$, and hence the risk of reaching the respective upper limits $Hmax_1$ to $Hmax_J$. The regulating performances are then globally better for the whole of the network. For example $a_k=0.01 *b_k$ is chosen.

The correction parameter computation algorithm carried out in module 13 is "gradient"-type. It consists in fact in modifying the value of the correction parameters $H_k$ by a quantity opposed to the gradient (derivate) of a load optimization criterion "J" which is:

$$J=JC+JH \quad (11)$$

with $JC=(C_k-b_k)^2$ and $JH=a_k* H_k^2$

Criterion JC minimizes the difference between the real load of the relay and its nominal load. Criterion JH an be interpreted for example as a cost, for a reduction in service contributed by the displacement of the boundary of cell $CE_K$ when $H_k$ increases.

The opposite of the derivate of J in relation to $H_k$ is:

$$dJ/dH_k=2*(-dC_k/dH_k)*(C_k-b_k-a_k*H_k) \text{ with } a_k=\alpha_k/(dC_k/dH_k). \quad (12)$$

$(dC_k/dH_k)$ being negative, derivate (12) is indeed of the same sign as "delta" in relation (8).

Moreover it should be noted that the operator of the cellular network can only allot one or several global automatons to one or several given relays whose traffic varies greatly and frequently, whereas the other relays are conventional, with respective field correction parmeters properly chosen in relation to the means or maximum traffics.

GLOBAL LOAD REGULATING AUTOMATON

According to a second and more highly performing mode of embodiment, a global load regulating automaton considers for the computation of the correction parameter $H_k$ for relay $R_k$, not only the load indicator $C_k$ of the relay in question, but also the load of the adjacent relays and the whole of the cellular radio communication network. Moreover the modification to the values of the correction parameters of two relays $R_k$ and $R_j$ implies a displacement of the boundary $FR_{jk}$ as a function of the difference $H_k-H_j$ as already indicated in reference to FIG. 4, which can result in a degradation in the quality of service due to less good radio conditions for the mobiles close to the boundary. The regulating automaton according to this second embodiment can be advantageously conditioned by a boundary displacement criterion.

A theoretical global optimization criterion JG of the load on a cell network can be:

$$JG = JGC + JGH \quad (13)$$

where $$JGC = \sum_{k=0}^{k=i} S_k^2, \text{ with } S_k = 0$$

if $C_k < b_k$ and $$S_k = (C_k - b_k)/b_k \text{ if } C_k > b_k$$

$$JGH = a_k \cdot H_k^2 + \sum_{k=0}^{k=i}\sum_{j\in V_k} \mu_{k,j} \cdot (H_k - H_j)^2$$

$V_k$ being the set of indices relating to the cells adjacent to cell $CE_k$.

$S_k$ corresponds to the overload of cell $CE_k$. JGC denotes the global overload of the network according to a quadratic criterion.

The opposite of the derivate of JG in relation to $H_k$ is:

$$\frac{djG}{dH_k} = \frac{2}{b_k} \cdot \left(- \frac{dC_k}{dH_k}\right) \cdot (S_k - WS_k - (a_k/b_k) \cdot H_k - WD_k) \quad (14)$$

with $$WS_k = \sum_{j\in v_k} \sigma_{k,j} \cdot S_j; \quad (15)$$

$$\sigma_{k,j} = -\frac{b_k}{b_j} \cdot \frac{dC_j}{dH_k} / \left(\frac{dC_k}{dH_k}\right);$$

$$a_k = -\alpha_k \cdot b_k^2 / \left(\frac{dC_k}{dH_k}\right);$$

$$WD_k = \sum_{j\in V_k} u_{k,j} \cdot (H_k - H_j); \quad (16)$$

-continued $$u_{k,j} = -(\mu_{k,j} + \mu_{j,k}) \cdot b_k / \left(\frac{dC_k}{dH_k}\right)$$

Comparatively to derivate (12), derivate (14) contains a term $Ws_k$ appearing as a linear combination of the overload of the relay adjacent to relay $R_k$ and a term $WD_k$ which is correlated to the displacement of the boundaries between relay $R_k$ and its adjacent relays.

By applying a "gradient"-type algorithm, and using derivate (14), a global "delta" term is obtained according to a relation similar to relation (8).

$$\text{delta } g = C_k - W_k - a_k * H_k \quad (17)$$
$$\text{with } W_k = b_k + b_k * (Ws_k + WD_k),$$

where $WS_k$ is an overload indicator which is representative of the overload of the adjacent cells, and $WD_k$ is an indicator representative of the displacement of the boundaries with the adjacent cells. According to this second embodiment, the correction proximity computation module 13 (FIG. 9) in relay $R_k$ can still be used by replacing $b_k$ by $W_k$. The factor $W_k$ is hereinafter referred to as "proximity load global indicator".

Figure 7:
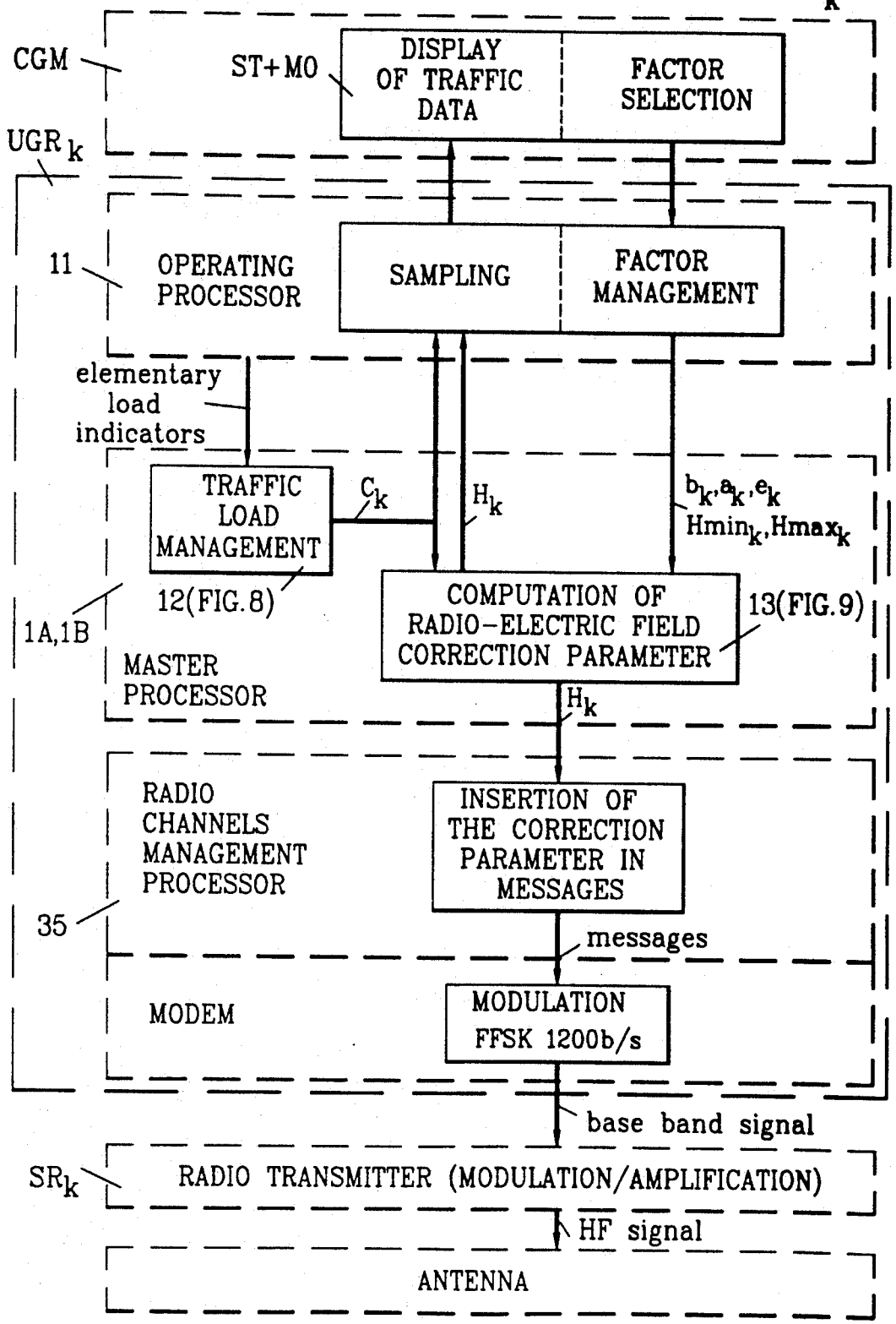
FIG. 7 is a schematic block diagram of a local load regulation automaton for a given relay according to a first embodiment of the invention.

The global automaton according to this second embodiment also includes management units $UGR_1$ to $UGR_I$ in relays $R_1$ to $R_I$ as illustrated in FIG. 7 and in particular each comprising modules 12 and 13 as shown in FIGS. 8 and 9, but also hardware means centralized in the management and maintenance center CGM to compute the proximity load global indicators $W_1$ to $W_I$, and more especially elementary indicators $WS_1$ to $WS_I$ and $WD_I$ and $WS_I$. These centralized computation means are now described in detail.

Figure 10:
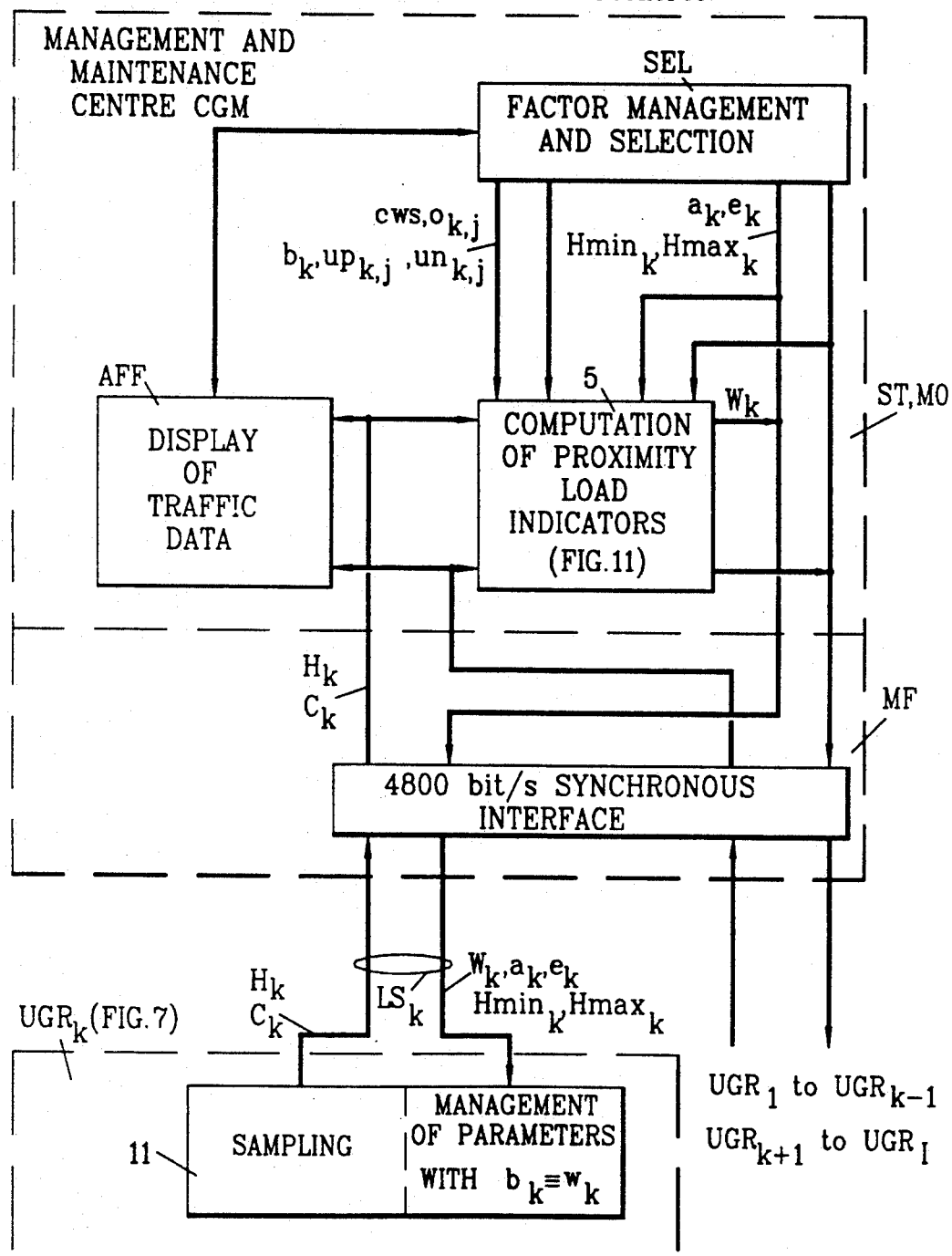
FIG. 10 is a schematic block diagram of a load regulating automaton for all the relays in the cellular network, according to a second embodiment of the invention.

As shown in FIG. 10 the global load regulating automaton comprises, further the local automata of relays $R_1$ to $R_I$ according to FIG. 7, a centralized digital computation module 5 included in the management and maintenance center GCH and in practice, mainly distributed in work-station ST and partially in front end machines MF according to FIG. 3.

The centralized computation module 5 records the values of load indicators $C_1$ to $C_I$ and correction parameters $H_1$ to $H_I$ which are transmitted periodically, every 30 s for example, from the relays to the management and maintenance center. The proximity load indicators $W_1$ to $W_I$ are computed and stored in memory and periodically transmitted to the relays, every 30 s according to the example above. These proximity load indicators replace the nominal load thresholds $b_1$ to $b_I$ in the local automata, respectively.

Thus, according to relations (8) and (17), each of the local automata tends to maintain the value of the respective load indicator $C_k$ equal to $$c_k = W_k + a_k * H_k. \quad (18)$$

The different factors for the computation of the proximity load indicators and for the local automata in the relay are managed in center CGM. Moreover the values of the load indicators and correction parameters are displayed by monitor Mo of station ST in the center CGM so as to be able to analyze the traffic status of the cellular network.

Figure 11:
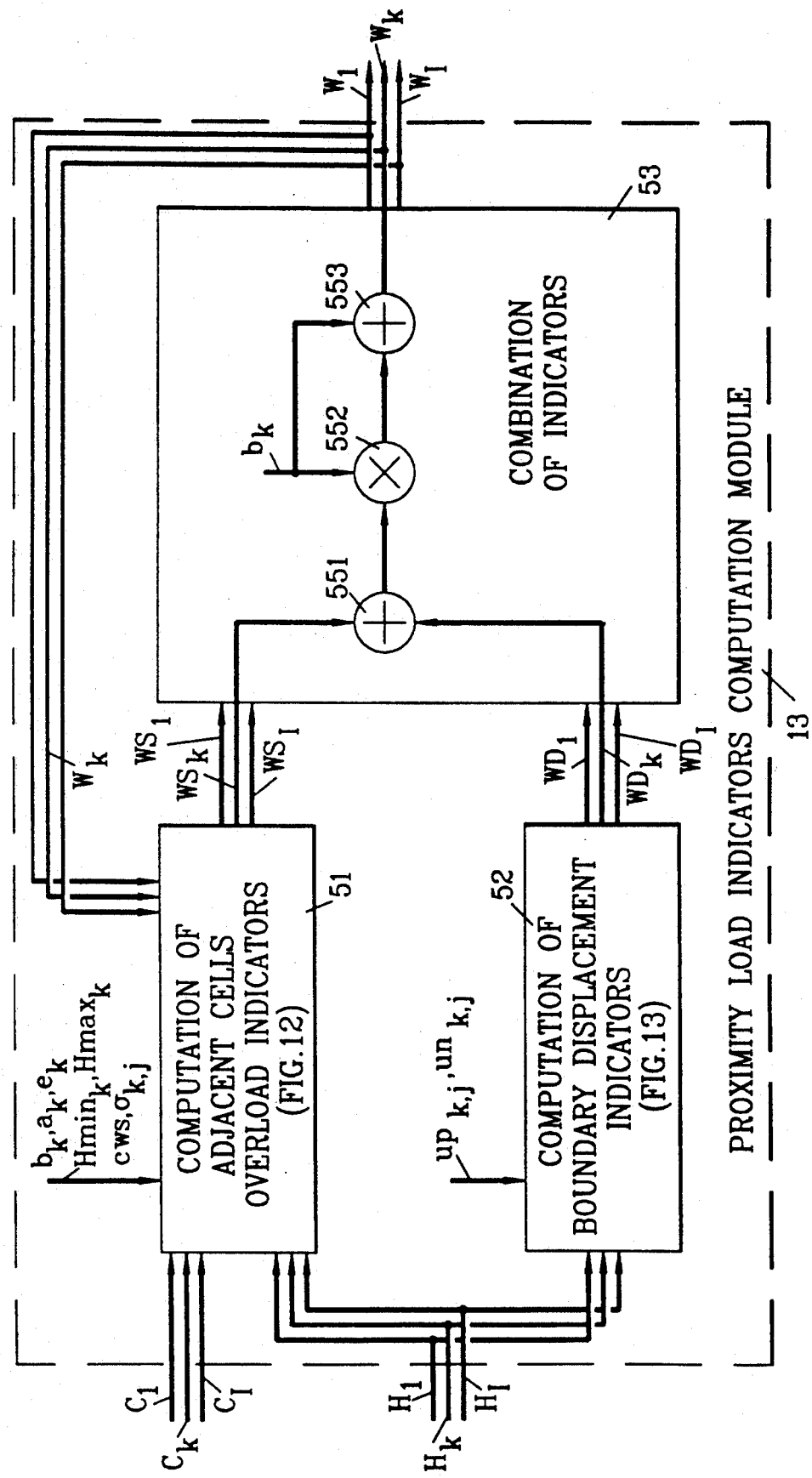
FIG. 11 is a detailed block diagram of a proximity load indicator computation module included in the management and maintenance center according to FIG. 10.

According to FIG. 11 the proximity load indicators computation module 5 included in work-station ST comprises, for each relay $R_1$ to $R_I$, three modules: an adjacent cells overload indicators computation module 51, a boundary displacement indicators computation module 52, and an overload and displacement indicators combination module 53.

The indicators combination module 53, for cell $CE_K$, makes the sum of the adjacent-cells overload indicator $WS_k$ and of the displacement indicator $WD_k$ transmitted by modules 51 and 52 to an adder 551, then multiplies this sum by the nominal load threshold $b_k$ into a produce and adds this produce and the same threshold $b_k$ through a multiplier 552 and an adder 553, to obtain the proximity load indicator $W_k$.

Figure 12:
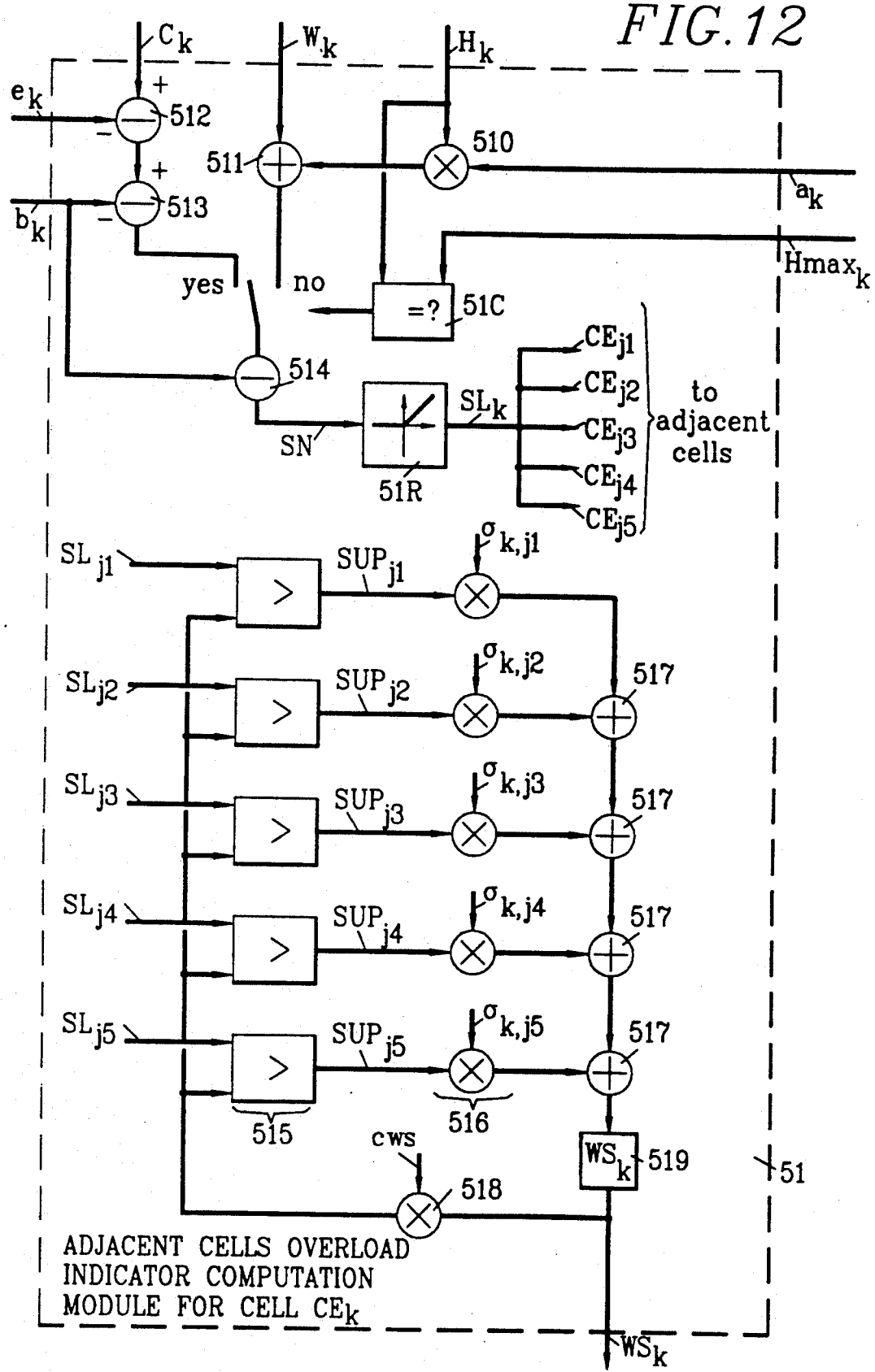
FIG. 12 shows, in the form of a schematic algorithm, an adjacent-cell overload-indicator module for a given cell in the network, included in the-computation module shown in FIG. 11.

In reference to FIG. 12, module 51 computes the overload indicator $WS_k$ attributed to cell $CE_k$ and relative to the adjacent cells, by applying the formula (15), with different arrangements designed to privilege the regulation of the load of the most saturated relays in the network.

In a first part, module 51 computes a local overload indicator $SL_k$. The overload of relay $R_k$ is the quantity $C_k - b_k$ used in the equations (13). Nevertheless in the case where the correction parameter $H_k$ has not reached the upper limit $Hmax_k$ in a comparator 51C, this quantity is evaluated by means of a multiplier 510 and an adder 511 which receive the values of the $W_k$ and also of $a_k$ and $H_k$, stored in memory in the previous computation cycle. In fact the local automaton in relay $R_k$ maintains $c_k$ approximately equal to $W_k + a_k * H_k$ according to the equation (18). This method provides for better algorithm stability, because the local overload indicator $SL_k$ is thus not subject to the fluctuations of $C_k$. In the case where comparator 51C detects that the correction parameter $H_k$ has reached the upper limit $Hmax_k$, the quantity $C_k - b_k$ is reduced by the hysteresis threshold $e_k$ via two subtractors 512 and 513. The overload indicator is normalized by division by the nominal load threshold $b_k$ in a divider 514. A rectifier 51R takes account of positive values of the normalized overload indicator SN. The upper part of the diagram in FIG. 12 indicates that:

if $H_k < Hmax_k$, then $SN = (W_k + a_k * H_k)/b_k$
if $H_k = Hmax_k$, then $SN = (C_k - b_{k-ek})/b_k$
if $SN > 0$, then $SL_k = SN$ otherwise, $SL_k = 0$.

The local overload indicator $SL_k$ is representative of the overload of relay $R_k$ in relation to the nominal load threshold $b_k$. It is normalized so as to be able to compare it to the indicators of the other cells.

According to FIG. 12, in the second part, module 51 computes for each cell $CE_k$, an overload indicator of the adjacent cells as from the local overload indicators $SL_j$ of adjacent cells $CE_j$, via comparators 515, multipliers 516 and adders 517, along the following formula:

$$WS_k(t) = \sum_{j \in V_k} \sigma_{k,j} \cdot SUP_j$$

with
if $SL_j > cws * Ws_k(t-1)$, then $SUP_j = SL_j$
if $SL_j < cws * Wsk(t-1)$, then $SUP_j = cws * WS_k(t-1)$.

$V_k$ is the set of cells adjacent to cell $cE_k$, here numbering 5 and associated to indices j1 to j5 in FIG. 12. When $cws = 0$, equation (15) is obtained. Nevertheless to favour the most heavily loaded cells in the computation of $WS_k$, the factor cws is taken as different from zero on input to a multiplier 518, which eliminates from the sum of values of overload indicators $SL_j$, the lowest ones:

$$0 < cws < 1/ \sum_{j \in V_k} \sigma_{k,j}$$

With $$\sum_{j \in V_k} \sigma_{k,j} = 1$$

when cws approaches the upper limit equal to 1, $WS_k$ becomes equal to the local overload indicator $SL_j$ of the most heavily loaded adjacent cell j.

The overload indicator of adjacent cells $WS_k(t)$ is stored in memory in 519 so as to subsequently intervene in the computation of the $WS_k(t+1)$.

Thus by choosing cws as non-null, the value of the indicator $WS_k$ of the cells adjacent to the most heavily loaded cells is increased. According to equation (18), the load of these adjacent cells is thus increased, and a part of the load to the most heavily loaded cells is thus transferred to their adjacent cells.

Figure 13:
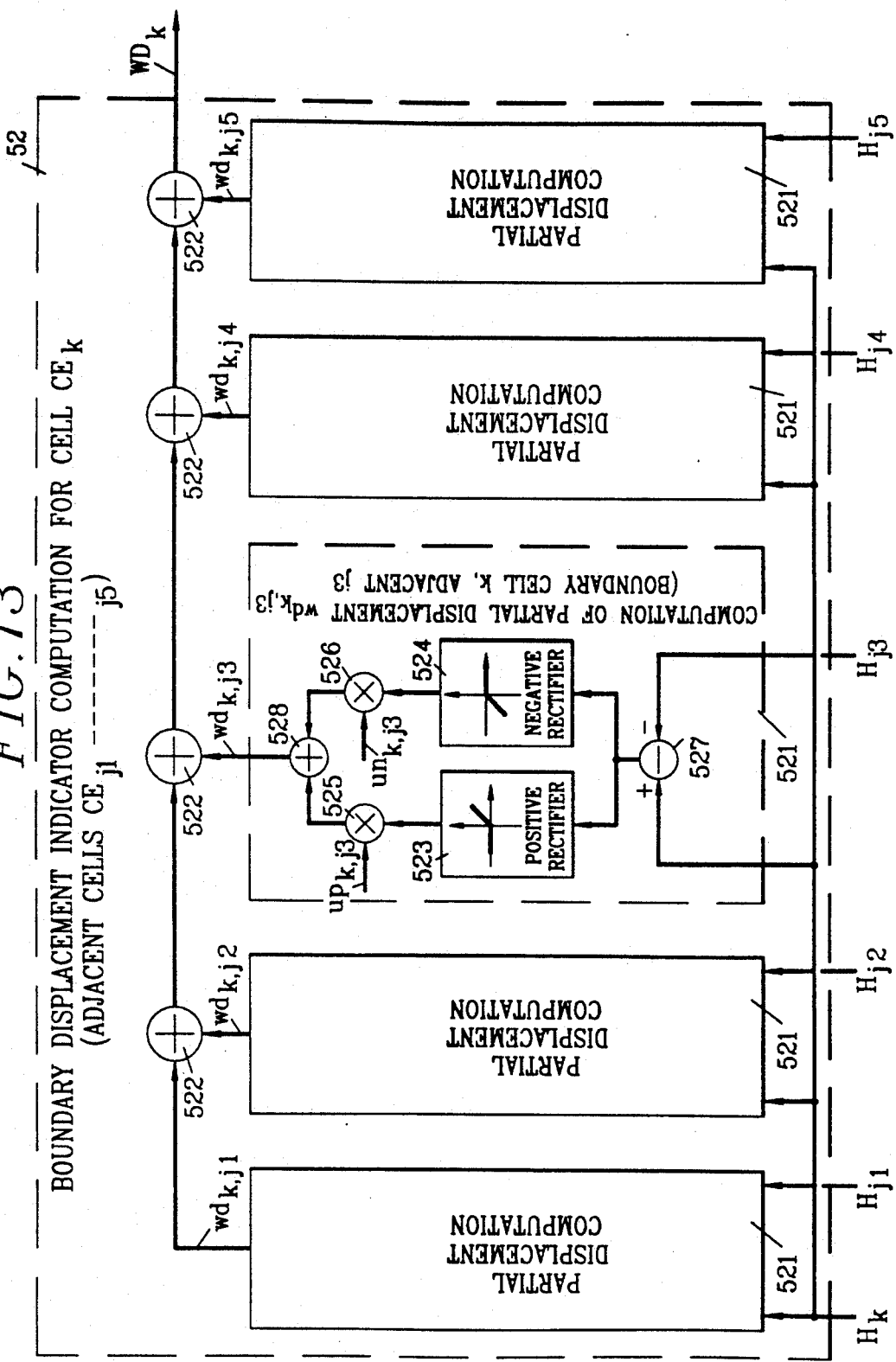
FIG. 13 shows, in the form of a schematic algorithm, a boundary displacement indicator computation module, for a given cell, included in the computation module according to FIG. 11.

Referring to FIG. 13, the boundary displacement indicator module 52 includes means for computing the boundaries displacement indicator for cell $CE_k$ in the form of several partial displacement computation circuits 521 and adders 522.

For each cell $CE_j$ adjacent to cell $CE_k$, the respective circuit 521 computes a partial boundary displacement indicator $wd_{k,j}$ according to the relations:

if $H_k > H_j$, $wd_{k,j} = up_{k,j}*(H_k - H_j)$
if $H_k < H_j$, $wd_{k,j} = un_{k,j}*(H_k - H_j)$.

For this purpose as shown in detail in circuit 521 relating to adjacent cell $CE_{j3}$, a circuit 521 includes two serial assemblies with respectively a positive 523 and negative 524 rectifier and a multiplier 525, 526 between an input subtractor 527 and an output adder 528.

Indicator $WD_k$ is obtained by summating in 522 the partial boundary displacement indicators $wd_{k,j}$ on all the adjacent cells of $CE_k$:

$$Wd_k = \sum_{j \in V_k} wd_{k,j}$$

With $up_{k,j} = un_{k,j}$, formula (16) is obtained.

Generally speaking, when $H_k > H_j$, cell $CE_k$ is more heavily loaded than cell $CE_j$. In this case the partial displacement indicator $wd_{k,j}$ between cells $CE_k$ and $CE_j$ is positive for cell $CE_k$ entailing an increase in the load for this cell, and negative for cell $CE_j$, entailing a reduction in the load for this cell.

Thus preferably the $un_{k,j} > up_{k,j}$ inequality is imposed, for example $un_{k,j} = 2*up_{k,j}$, with a view to favouring the reduction in load of the most heavily loaded cell. This method provides for a better load regulation for the most heavily loaded cells.

Figure 14:
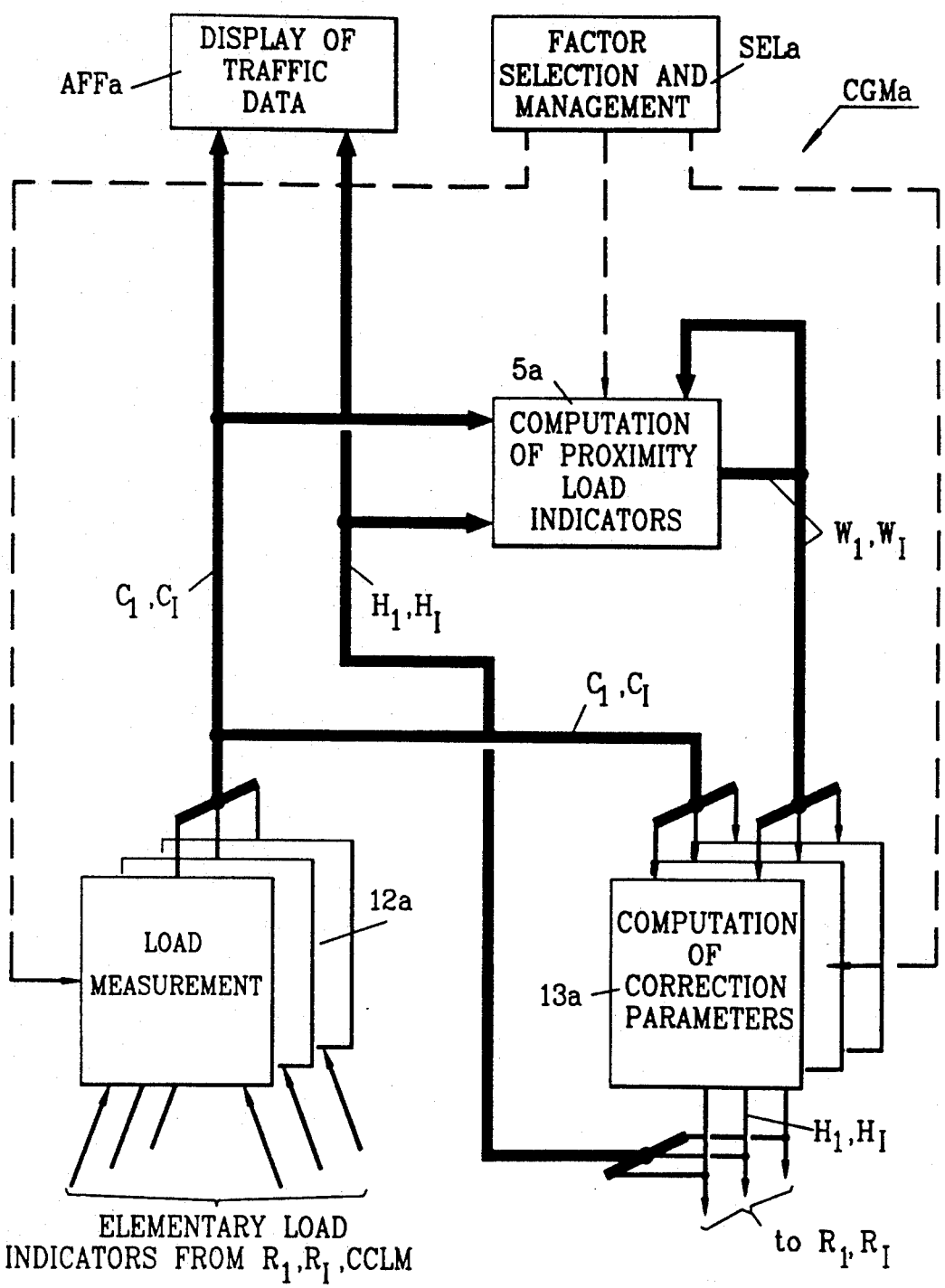
FIG. 14 is a schematic block diagram showing the centralized computation facilities in the management and maintenance center.

According to another embodiment of the global load regulating automaton shown in FIG. 14, all the computations of load indicators and correction parameters are centralized in a management and maintenance center CGMa. In a similar way to FIG. 10, the work-station/monitor ST/MO assembly of the CGMa center contains:

centralized facilities 5a for computing proximity load indicators $W_1$ to $W_I$ a function of load indicators $C_1$ to $C_I$ and correction parameters $H_1$ to $H_I$ for all the cells $CE_1$ to $CE_I$ in the network, centralized facilities AFFAa for displaying the traffic data notably contingent on the load indicators and field correction parameters for all the cells in the network, and centralized facilities SELa for selecting and managing automaton factors such as $cws, o_{k,j}, b_k, up_{k,j}, un_{k,j}, b_k, a_k, c_k, Hmin_k, Hmax_k, ca, cr$ for each cell $CE_k$ with $1 \leq k \leq I$.

Moreover, comparatively to FIG. 7, the following are remoted in the management and maintenance center CGMa:

facilities 12a for measuring the load so as to produce the load indicators $C_1$ to $C_I$; facilities 12a can also use elementary load indicators generated by relays $R_1$ to $R_I$, and elementary load indicators generated by the centralized equipments such as the switching and location center CCLM, as for example the number of inscriptions in a localization area; and facilities 13a to compute the correction parameters $H_1$ to $H_I$ as a function of load indicators and proximity load indicators.

What I claim is:

1. A method of regulating traffic loads in fixed stations which are respectively included in and associated with cells in a cellular radio communication network where mobile stations measure radio-electric fields transmitted by said fixed stations,
said method comprising, relating to each of said fixed stations, the steps of:
computing a field correction parameter as a function of at least a load indicator of each of said fixed stations depending on the traffic supported by each of the fixed stations and periodically re-evaluated, and on fixed factors, and
transmitting said field correction parameter to said mobile stations, and, relating to each of said mobile stations, the step of:
correcting the measured radio-electric field corresponding to each of said fixed stations by said correction parameter into a corrected field, so that each of said mobile stations compares respective corrected fields corresponding to said fixed stations and selects the one of said fixed stations corresponding to the highest corrected field to establish a radio communication with the selected fixed station.

2. A method as claimed in claim 1, wherein said load indicator of each of said fixed stations depends on a linear combination of elementary load indicators.

3. A method as claimed in claim 2, wherein said load indicator of each of said fixed stations is computed by averaging said linear combination during a predetermined period, then by undergoing recursive filtering.

4. The method of claim 2 wherein the elementary load indicators are the number of waiting radio channel requests in each of said fixed stations.

5. The method of claim 2 wherein the elementary load indicators are the number of busy radio channels in each of said fixed stations.

6. A method as claimed in claim 1, wherein said fixed factors are chosen from amongst a nominal load threshold, a loss factor, a hysteresis threshold and maximum and minimum value of said correction parameter.

7. A method as claimed in claim 1, wherein said field correction parameter of each of said fixed stations is regulated periodically between predetermined maximum and minimum values by a positive/negative increment which is determined by a comparison of a difference between said load indicator and said field correction parameter with a hysteresis threshold.

8. A method as claimed in claim 7, wherein said difference further consists in subtracting a load threshold from said load indicator.

9. A method as claimed in claim 7, wherein said correction parameter is multiplied by a loss factor in said difference.

10. A method as claimed in claim 1, wherein said field correction parameter of each of said fixed stations further depends on a periodically re-evaluated proximity load indicator which is a combination of:
- an overload indicator relating to the fixed stations included in some of said cells which are adjacent to the cell associated with each of the fixed stations and
- a boundary displacement indicator relating to field boundaries between said adjacent cells and said cell associated with each of the fixed stations,
- a boundary between two cells of said adjacent cells being determined by an equality of the corrected fields corresponding to said two cells and being displaced as a function of variations in said correction parameter of said two cells.

11. A method as claimed in claim 10, wherein said overload indicator relating to the adjacent fixed stations depends on local overload indicators related respectively to the adjacent stations, the local overload indicator of each of said fixed stations being a function of said load indicator of each of the fixed stations when said correction parameter of each of the fixed stations is equal to a maximum value and being function of said correction parameter of each of the fixed stations and said proximity load indicator of each of the fixed stations when said correction parameter is lower than said maximum value.

12. A method as claimed in claim 11 wherein, when said correction parameter of each of said fixed stations is equal to said maximum value, said local overload indicator is equal to the difference between the load indicator and a sum of a nominal load threshold of each of said fixed stations and a hysteresis threshold that conditions a positive/negative incrementation of said field correction parameter.

13. A method as claimed in claim 11, wherein, when said correction parameter of each of said fixed stations is less than said maximum value, said local overload indicator is equal to a sum of said proximity load indicator and the product of said correction parameter by a loss factor.

14. A method as claimed in claim 11, wherein said local overload indicator is normalized in relation to a nominal load threshold of each of said fixed stations.

15. A method as claimed in claim 11, further including the step of comparing said overload indicator of each of said fixed stations with each of said local overload indicators of said adjacent cells thereby summing greatest indicators into said overload indicator.

16. A method as claimed in claim 11, wherein said boundary displacement indicator is equal to a sum of partial displacement indicators relating respectively to the field boundaries between said adjacent cells and said cell of each of said fixed stations, said partial displacement indicator of one of said adjacent cells being equal to the difference between said correction parameters of said adjacent cells and said cell of each of said fixed stations.

17. A method as claimed in claim 16, wherein said correction parameter difference is weighted by two factors, respectively when said difference is positive or negative.

18. A method as claimed in claim 7,
wherein said field correction parameter of each of said fixed stations depends on a periodically re-evaluated proximity load indicator which is a combination of:
- an overload indicator relating to the fixed stations included in some of said cells which are adjacent to the cell associated with each of said fixed stations and
- a boundary displacement indicator relating to field boundaries between said adjacent cells and said cell associated with each of said fixed stations,
- a boundary between two cells of said adjacent cells being determined by an equality of the corrected fields corresponding to said two cells and being displaced as a function of variations in said correction parameters of said two cells, and
wherein said difference between said load indicator and said correction parameter further consists of subtracting said proximity load indicator from said load indicator.

19. A method as claimed in claim 10, wherein said proximity load indicator of each of said fixed stations is derived from a sum of said overload indicator and said boundary displacement indicator, from a product of said sum by a nominal load indicator of each of said fixed stations, and from an addition of said product and a threshold for said nominal load.

20. A method as claimed in claim 10, wherein the proximity load indicator computation is made in centralized facilities linked to the fixed stations of said cellular network.

21. A method as claimed in claim 11, wherein the computations of said correction parameter, load indicator and proximity load indicator for each of said fixed stations are made in centralized facilities linked to the fixed stations.

22. A method as claimed in claim 1, wherein the computation of said load correction parameter of each of said fixed stations is made locally in said fixed stations.

* * * * *